(12) United States Patent
Ueoka

(10) Patent No.: US 8,606,441 B2
(45) Date of Patent: Dec. 10, 2013

(54) VEHICULAR CONTROL DEVICE, METHOD OF CONTROLLING A VEHICLE, AND A STORAGE MEDIUM HAVING STORED THEREIN A PROGRAM THAT IMPLEMENTS THE METHOD

(75) Inventor: Kiyoshiro Ueoka, Nisshin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 783 days.

(21) Appl. No.: 12/517,225

(22) PCT Filed: Sep. 5, 2007

(86) PCT No.: PCT/JP2007/067695
§ 371 (c)(1),
(2), (4) Date: Jun. 2, 2009

(87) PCT Pub. No.: WO2008/081619
PCT Pub. Date: Jul. 10, 2008

(65) Prior Publication Data
US 2010/0076637 A1  Mar. 25, 2010

(30) Foreign Application Priority Data
Dec. 27, 2006 (JP) ................. 2006-352434

(51) Int. Cl.
*G06F 19/00* (2011.01)
(52) U.S. Cl.
USPC .............. 701/22; 701/48; 701/70; 701/83; 701/84; 180/53.2; 180/65.1; 180/65.21; 477/3; 477/4; 477/5; 477/9; 477/7

(58) Field of Classification Search
USPC ........... 701/70, 84, 78, 83, 90, 22, 48, 81, 71; 180/53.2, 65.21, 65.1; 477/3, 4, 5, 9, 7
See application file for complete search history.

(56) References Cited

U.S. PATENT DOCUMENTS

| | | | | |
|---|---|---|---|---|
| 4,784,020 A | * | 11/1988 | Hamano et al. | 477/93 |
| 5,060,768 A | * | 10/1991 | Yamashita et al. | 477/39 |
| 5,119,694 A | | 6/1992 | Sato et al. | |
| 5,457,363 A | * | 10/1995 | Yoshii et al. | 318/432 |
| 5,692,990 A | * | 12/1997 | Tsukamoto et al. | 477/93 |
| 5,905,349 A | * | 5/1999 | Farkas et al. | 318/432 |
| 6,278,916 B1 | * | 8/2001 | Crombez | 701/22 |
| 6,377,007 B1 | * | 4/2002 | Ozaki et al. | 318/432 |

(Continued)

FOREIGN PATENT DOCUMENTS

| | | |
|---|---|---|
| JP | 4-194454 A | 7/1992 |
| JP | 5-164243 A | 6/1993 |
| JP | 7-154905 A | 6/1995 |
| JP | 2006-50811 A | 2/2006 |

*Primary Examiner* — Thomas Black
*Assistant Examiner* — Sara Lewandroski
(74) *Attorney, Agent, or Firm* — Kenyon & Kenyon LLP

(57) ABSTRACT

An ECU executes a program including the steps of: setting a creep torque reflection ratio; if brake is applied and the vehicle is currently stopped, updating the creep torque reflection ratio to 0; if brake is not applied and despite that the brake fluid's pressure is larger than a hydraulic pressure value, determining that brake hold control is currently exerted, and reducing the creep torque reflection ratio, as based on a map having the brake fluid's pressure as a parameter, to update the creep torque reflection ratio.

19 Claims, 10 Drawing Sheets

(56) References Cited

U.S. PATENT DOCUMENTS

| | | | |
|---|---|---|---|
| 6,616,572 B2* | 9/2003 | Suzuki | 477/86 |
| 6,896,340 B2* | 5/2005 | Kinser et al. | 303/192 |
| 7,291,090 B2* | 11/2007 | Ueno | 477/4 |
| 7,325,665 B2* | 2/2008 | Kamishima et al. | 192/220.1 |
| 2002/0094899 A1* | 7/2002 | Hamai | 475/5 |
| 2005/0017580 A1* | 1/2005 | Cikanek et al. | 303/191 |
| 2005/0211478 A1* | 9/2005 | Sakuma et al. | 180/65.1 |
| 2008/0103668 A1* | 5/2008 | Kamikado | 701/70 |
| 2008/0140291 A1* | 6/2008 | Kobayashi et al. | 701/70 |
| 2008/0294319 A1* | 11/2008 | Baijens et al. | 701/70 |
| 2010/0076661 A1* | 3/2010 | Ueoka et al. | 701/84 |

* cited by examiner

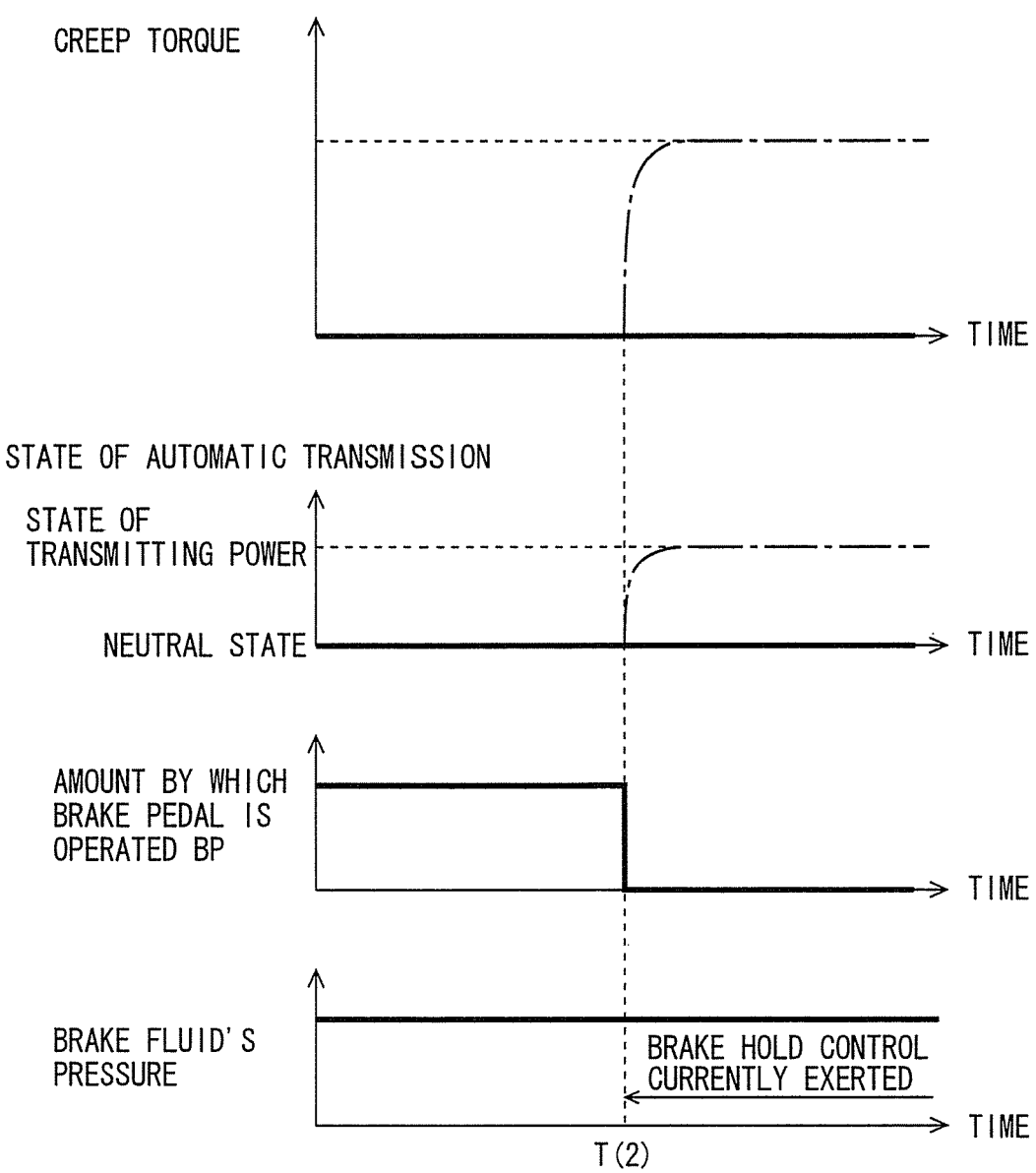

VEHICULAR CONTROL DEVICE, METHOD OF CONTROLLING A VEHICLE, AND A STORAGE MEDIUM HAVING STORED THEREIN A PROGRAM THAT IMPLEMENTS THE METHOD

This is a 371 national phase application of PCT/JP2007/067695 filed 5 Sep. 2007, claiming priority to Japanese Patent Application No. 2006-352434 filed 27 Dec. 2006, the contents of which are incorporated herein by reference.

TECHNICAL FIELD

The present invention relates generally to controlling a vehicle having a motive power source and a braking device, and particularly to controlling a vehicle generating a creep torque by the motive power source.

BACKGROUND ART

When an automatic transmission (A/T) vehicle generating driving force by an engine has a traveling position (a forward position or a reverse position) selected, it generates a force to propel a vehicle to creep at a slow speed even if the accelerator pedal is not operated. An electric vehicle (EV) generating driving force by an electric motor and a hybrid vehicle (HV) generating driving force by both an engine and an electric motor generate a creep force by a torque that the electric motor generates. For such vehicles generating a creep force by an electric motor a technique improving driveability and reducing wasteful electric power consumption is disclosed in Japanese Patent Laying-open No. 2006-50811.

Japanese Patent Laying-open No. 2006-50811 discloses an electric vehicle generating a creep torque by a driving force that an electric motor generates when a predetermined condition is established. The electric vehicle includes: a detection unit detecting a driver's brake pedal operation; a vehicular speed detection unit detecting vehicular speed; a first creep torque setting unit setting a creep torque command value in accordance with vehicular speed, as based on a predetermined reference characteristic line, when a creep torque is generated; and a creep torque cutting unit setting an upper limit value for a creep torque in accordance with an amount by which the brake pedal is operated when a creep torque is generated and the driver presses the brake pedal. The creep torque cutting unit includes: a plurality of units setting an upper limit value for a creep torque, as based respectively on a predetermined plurality of upper limit value setting characteristic lines setting an upper limit value for a creep torque in accordance with an amount by which the brake pedal is operated; a unit selecting in accordance with the vehicles condition one of the plurality of units setting an upper limit value for a creep torque; and a second creep torque setting unit setting an upper limit value for a torque that is set by the selected unit setting an upper limit value for a creep torque, as a new creep torque command value if a creep torque command value set by the first creep torque setting unit is larger than the upper limit value for a torque that is set by the selected unit setting an upper limit value for a creep torque.

According to Japanese Patent Laying-open No. 2006-50811, when the electric vehicle generates a creep torque and also has the brake pedal pressed, an upper limit value can be set for the creep torque to cut the creep torque, and a plurality of characteristic lines setting an upper limit value for a creep torque can selectively be used in accordance with the vehicle's condition to set an upper limit value. Thus when the brake pedal is pressed an appropriate creep torque can be generated in accordance with the vehicles condition. The vehicle can thus be improved in driveability and reduce wasteful electric power consumption.

In recent years a vehicle is known that reduces a burden on a driver operating a brake in a traffic jam and the like. More specifically, when the vehicle is stopped in a forward position and in that condition once the vehicle has the brake pedal operated to a degree (e.g., in an amount) larger than a predetermined threshold value, then thereafter even if the brake pedal is not operated the braking force applied when the vehicle is stopped is maintained (i.e., brake hold control is exerted).

The electric vehicle disclosed in Japanese Patent Laying-open No. 2006-50811 cuts a creep torque in accordance with an amount by which the brake pedal is operated. However, the document is silent on a case where the brake hold control is exerted (i.e., a braking force is maintained while the brake pedal is not operated.)

DISCLOSURE OF THE INVENTION

The present invention has been made to overcome the above disadvantage, and it contemplates a control device appropriately suppressing a creep torque to reduce wasteful energy consumption in a vehicle that may maintain braking force while the brake pedal is not operated, a method of controlling the vehicle, and a storage medium having stored therein a program that implements the method.

The present control device controls a vehicle having a motive power source and a braking device and generating a creep torque by the motive power source. Once the vehicle stopped in a forward traveling position has a brake pedal operated to a degree larger than a predetermined degree, brake hold control is exerted to control the braking device such that until a request by a driver to start the vehicle is detected a braking force that is applied when the vehicle is stopped is held even if the brake pedal is not operated. The control device comprises: a detection unit detecting that the driver is operating the brake pedal; a vehicular speed detection unit detecting vehicular speed; an operation state detection unit detecting a state of an operation of the braking device; and a processing unit. The processing unit determines from the vehicular speed whether the vehicle is currently stopped. If the brake pedal is operated, the processing unit determines whether to suppress the creep torque, based on whether the vehicle is currently stopped. If the brake pedal is not operated, the processing unit determines whether to suppress the creep torque, based on the state of the operation of the braking device. If a decision is made to suppress the creep torque, the processing unit suppresses the creep torque.

In accordance with the present invention, when the brake pedal is operated and the vehicle is currently stopped, it is inferred that it is not necessary to propel the vehicle, and accordingly, a decision is made to suppress a creep torque. However, if once the brake pedal has been operated to a degree (e.g., in an amount) larger than a predetermined degree and the brake hold control is accordingly exerted, and thereafter the brake pedal is not operated, the braking force applied when the vehicle is stopped is still maintained. Such a case would also not require propelling the vehicle. Accordingly, if the brake pedal is not operated, whether to suppress a creep torque is determined from the braking device's state of operation. For example, if the braking device's hydraulic pressure is larger than a predetermined threshold value the second determination means determines that the brake hold control is currently exerted, and makes a decision to suppress a creep torque. Thus, when the brake pedal is not operated, and the brake hold control is exerted, a creep torque can be suppressed to reduce wasteful energy consumption. As a result, a control device can be provided that allows a vehicle that may have a braking force maintained while the brake pedal is not operated to have a creep torque appropriately suppressed to reduce wasteful energy consumption.

Preferably, the braking device is a hydraulic braking device. The operation state detection unit detects hydraulic pressure in the braking device. If the brake pedal is not operated, and the hydraulic pressure detected is larger than a predetermined threshold value, the processing unit determines to suppress the creep torque.

In accordance with the present invention if the braking device's hydraulic pressure is larger than a predetermined threshold value a decision is made that the brake hold control is currently exerted and a decision is made to suppress a creep torque. Whether the brake hold control is currently exerted can thus be determined from the braking device's hydraulic pressure to suppress the creep torque appropriately.

More preferably, the motive power source is a rotating electric machine; and the processing unit suppresses the creep torque by controlling the rotating electric machine to cause the rotating electric machine to provide a reduced output.

In accordance with the present invention, a creep torque is suppressed by controlling the rotating electric machine to cause the rotating electric machine to provide a reduced output. This can reduce the rotating electric machine's power consumption. Furthermore for example the rotating electric machine can output a torque adjusted in accordance with the braking device's hydraulic pressure to allow a creep torque to be suppressed in an adjusted amount.

More preferably, if with the brake pedal not operated the decision is made to suppress the creep torque, the processing unit suppresses the creep torque by controlling the rotating electric machine to cause the rotating electric machine to provide an output such that when the hydraulic pressure detected is large pressure the output is smaller than when the hydraulic pressure detected is small pressure.

For example if a vehicle is stopped on an uphill road and has a suppressed creep torque, and the brake fluid's pressure is small and a small braking force is applied, the vehicle's self weight may disadvantageously provide a force to move the vehicle backward against the driver's intention. In accordance with the present invention, if with the brake pedal not operated a decision is made to suppress a creep torque, the rotating electric machine has its output set to be smaller for larger hydraulic pressure detected. Thus when the brake fluid's pressure is large and there is a smaller possibility that the vehicle may move backward, a creep torque can be suppressed in a larger amount to reduce wasteful power consumption, and when the brake fluid's pressure is small and there is a larger possibility that the vehicle may move backward, a creep torque can be suppressed in a smaller amount to prevent the vehicle from moving backward.

More preferably, the vehicle has an automatic transmission connected to the motive power source and having an engagement element engaged when the vehicle starts, and the processing unit suppresses the creep torque by controlling the automatic transmission to release the engagement element.

In accordance with the present invention, a creep torque is suppressed by controlling the automatic transmission to release the engagement element. This can prevent the automatic transmission from transmitting power and a torque suppressing the motive power source's operation can be suppressed. Thus the motive power source's fuel consumption can be reduced.

BRIEF DESCRIPTION OF THE DRAWINGS

FIG. 12 is timing plots representing a state of an automatic transmission and a creep torque in a vehicle having the control device mounted therein according to the second embodiment of the present invention.

BEST MODES FOR CARRYING OUT THE INVENTION

Figure 1:
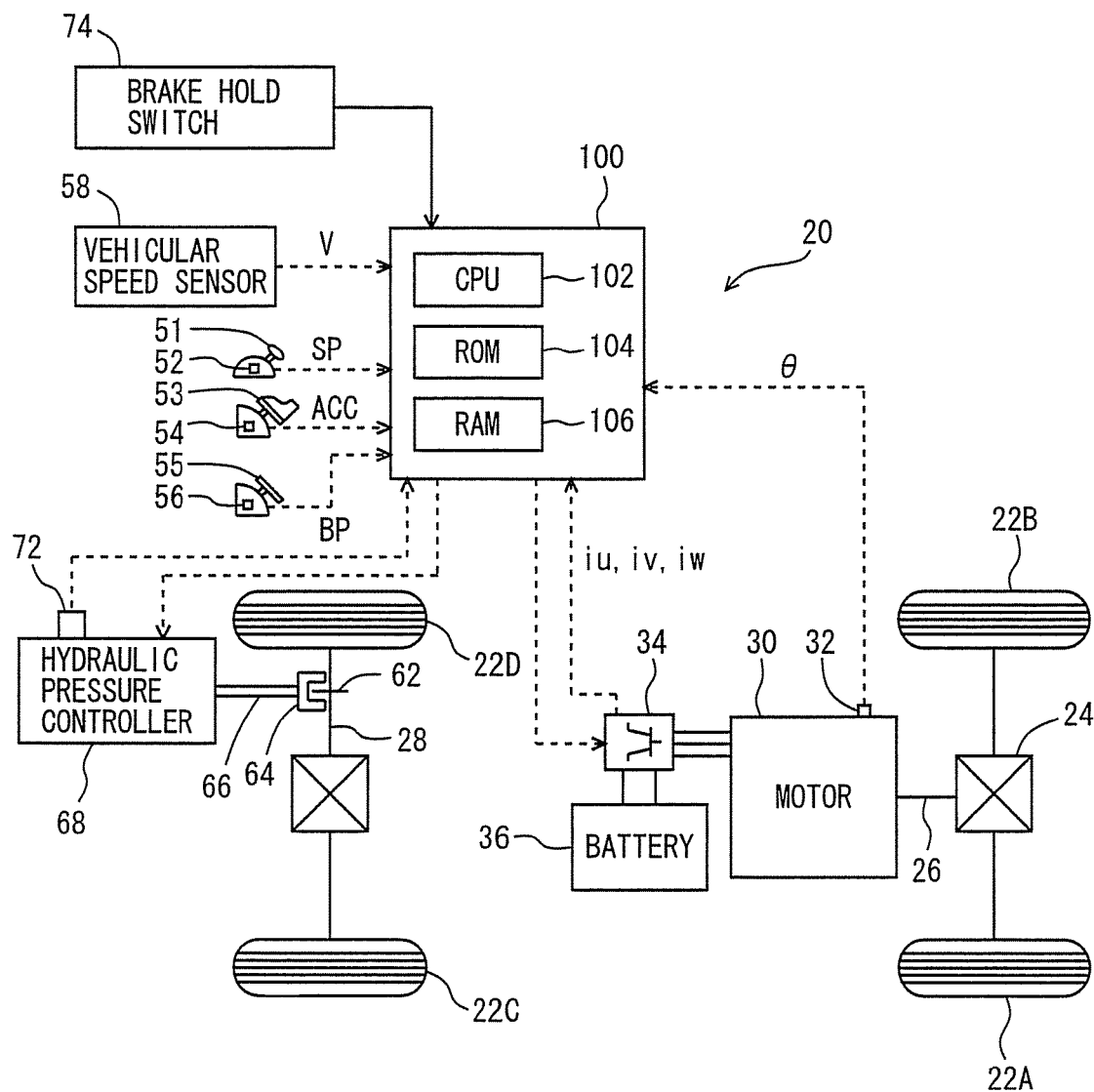
FIG. 1 shows a structure of a vehicle having a control device mounted therein according to a first embodiment of the present invention.

Hereinafter reference will be made to the drawings to describe the present invention in embodiments. In the following description, identical components are denoted by identical reference characters. Their names and functions are also identical. Accordingly, they will not be described repeatedly in detail.

First Embodiment

With reference to FIG. 1, the present embodiment provides a control device mounted in an electric vehicle 20 having a structure, as will be described hereinafter. The present control device is not only applicable to the FIG. 1 electric vehicle: it is applicable to an electric vehicle having a different manner, that generates a creep torque. Furthermore, the vehicle may not be an electric vehicle: it may be a hybrid vehicle traveling by the motive power of an engine and a motor.

Electric vehicle 20 includes drive wheels 22A, 22B, 22C, 22D, a propeller shaft 26 connected to drive wheels 22A, 22B via a differential gear 24, a motor 30 outputting motive power to propeller shaft 26 for driving the wheels for traveling, a battery 36 supplying motor 30 with electric power via an inverter 34, and an electronic control unit (ECU) 100 generally controlling electric vehicle 20.

Motor 30 is configured for example as a well known, permanent magnetic (PM) type, synchronous motor generator and driven by 3-phase alternate current electric power received from inverter 34.

Inverter 34 is configured as a well known inverter circuit having 6 switching elements, and receives direct current electric power from battery 36 and supplies it for example by pulse width modulation (PWM) control as pseudo 3-phase alternate current electric power to motor 30.

ECU 100 is configured as a microprocessor with a central processing unit (CPU) 102 serving as a center, and has other than CPU 102 a read only memory (ROM) 104 storing a processing program, a random access memory (RAM) 106 temporarily storing data, and an input/output port (not shown).

Electric vehicle 20 further includes a brake disk 62 provided at a drive shaft 28 connected to drive wheel 22D, a brake mechanism 64, a brake pipe 66, and a hydraulic pressure controller 68. Note that brake disk 62, brake mechanism 64 and brake pipe 66 may be provided for each drive wheel 22A, 22B, 22C, 22D.

Brake mechanism 64 receives the pressure of a brake fluid introduced into brake pipe 66 and in accordance with the brake fluid's pressure received sandwiches brake disk 62 to generate frictional braking force (hydraulic brake). The brake fluid's pressure in brake pipe 66 is adjusted by hydraulic pressure controller 68. Hydraulic pressure controller 68 receives a brake control signal from ECU 100 and outputs the brake fluid's pressure to brake pipe 66 in accordance with the brake control signal.

ECU 100 receives: a detection signal 0 from a rotational position detection sensor 32 detecting a rotational position of a rotor of motor 30; phase currents iu, iv, iw from a current sensor (not shown) attached to each phase of inverter 34; a shift position SP from a shift position sensor 52 detecting a position at which a shift lever 51 is operated; an accelerator pedal position ACC from an accelerator pedal position sensor 54 detecting an amount by which accelerator pedal 53 is operated; an amount by which brake pedal 55 is operated BP from a brake pedal position sensor 56 detecting the amount by which the brake pedal is operated; vehicular speed V from vehicular speed sensor 58; and the like through an input port. Note that while in the present embodiment a degree of operating brake pedal 55 is input to ECU 100 as the amount by which the brake pedal is operated BP, ECU 100 may receive a signal other than that. For example, ECU 100 may not receive the signal representing the amount by which the brake pedal is operated BP and may instead receive a signal representing a force applied to press the brake pedal.

Furthermore, ECU 100 receives signals from a brake fluid pressure sensor 72 and a brake hold switch 74 via an input port.

Brake fluid pressure sensor 72 detects the brake fluid's pressure in brake pipe 66 that is adjusted by hydraulic pressure controller 68, and brake fluid pressure sensor 72 transmits to ECU 100 a signal representing a result of detecting the pressure.

Brake hold switch 74 is operated by a driver to select whether the driver desires to exert brake hold control, as will be described later. If brake hold switch 74 is turned on, brake hold switch 74 transmits to ECU 100 a signal representing that the driver desires to exert the brake hold control. If brake hold switch 74 is turned off, brake hold switch 74 transmits to ECU 100 a signal representing that the driver does not desire to exert the brake hold control.

When ECU 100 causes electric vehicle 20 to travel, ECU 100 controls motor 30 to drive motor 30 to cause motor 30 to output a requested torque set as based on accelerator pedal position ACC and vehicular speed V. When ECU 100 brakes electric vehicle 20, ECU 100 controls motor 30 to drive motor 30 to cause motor 30 to output a braking torque set as based on the amount by which the brake pedal is operated BP and vehicular speed V.

To allow motor 30 to receive a motor current generating the above requested torque and braking torque, ECU 100 generates a switching control signal controlling a switching element that configures inverter 34 to turn on/off. Inverter 34 performs electric power conversion in response to the switching control signal to supply motor 30 with alternate current electric power.

Furthermore, when brake hold switch 74 is turned on, ECU 100 exerts the brake hold control to alleviate a burden imposed on the driver's braking operation in a traffic jam or the like. More specifically, ECU 100 detects shift position SP, vehicular speed V, accelerator pedal position ACC, and the amount by which the brake pedal is operated BP. If shift position SP is a forward position (a D position), accelerator pedal position ACC is approximately zero, vehicular speed V is approximately zero (i.e., the vehicle is currently stopped) and once the amount by which the brake pedal is operated BP has exceeded a predetermined threshold value, then ECU 100 exerts control such that until accelerator pedal 53 is operated to provide accelerator pedal position ACC exceeding a threshold value (i.e., the driver requests starting the vehicle) the braking force applied when the vehicle is stopped is maintained even if the amount by which the brake pedal is operated BP is reduced after amount BP has exceeded the predetermined threshold value.

In the present embodiment when brake pedal 55 is operated and electric vehicle 20 is currently stopped it is considered that the vehicle is stopped by the driver's intention. Furthermore, if brake pedal 55 is not operated, and the brake hold control is exerted, the braking force that is applied when the vehicle is stopped is maintained. In such cases, using the electric power of battery 36 to drive motor 30 to generate a creep torque will be wasteful energy consumption.

Accordingly, the present embodiment provides a control device controlling motor 30 to suppress a creep torque, as based on the amount by which the brake pedal is operated BP and brake fluid's pressure.

Figure 2:
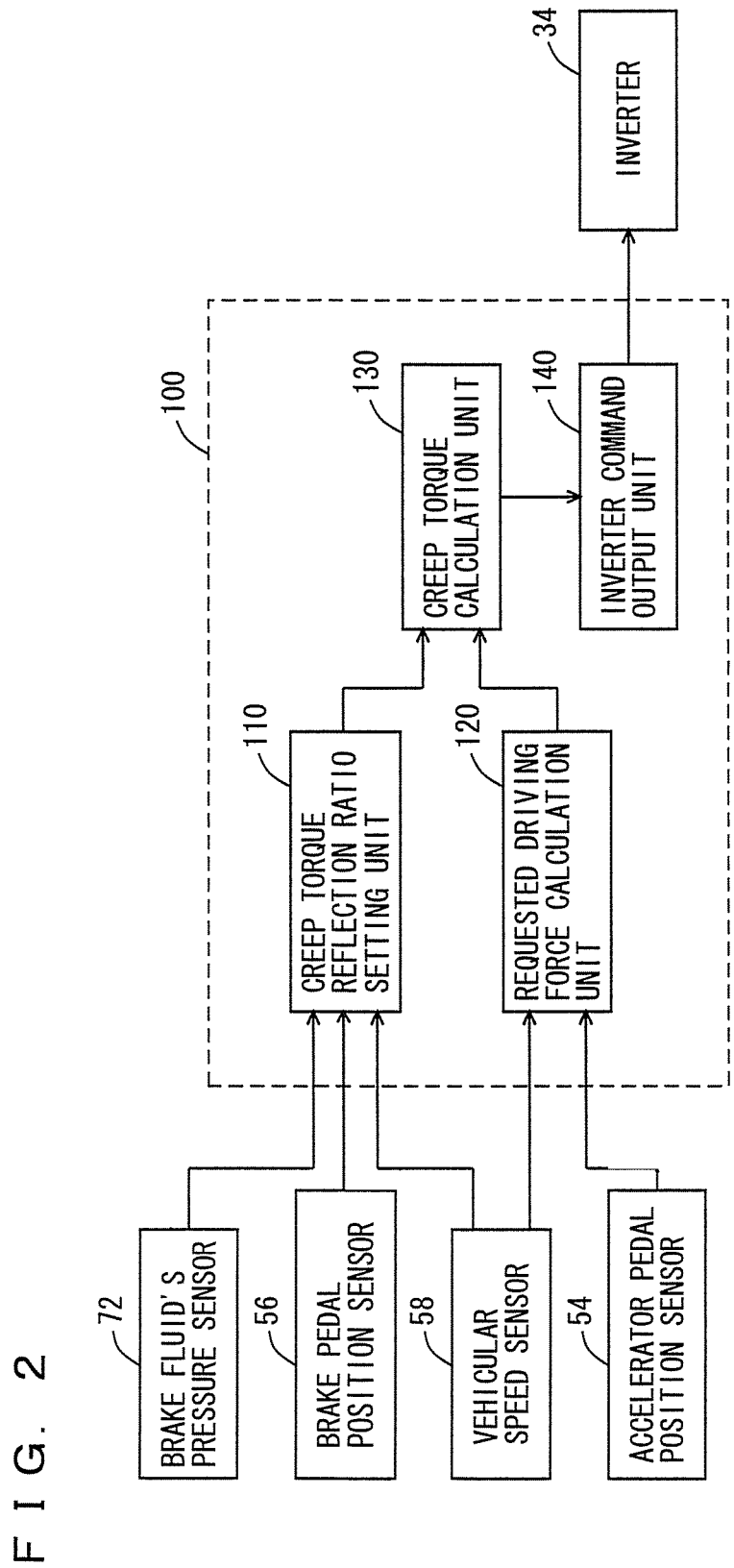
FIG. 2 is a block diagram of a function of the control device according to the first embodiment of the present invention.

Reference will now be made to FIG. 2 to describe a block diagram of a function of the control device according to the present embodiment. As shown in FIG. 2, the control device includes a creep torque reflection ratio setting unit 110, a requested driving force calculation unit 120, a creep torque calculation unit 130 connected to creep torque reflection ratio setting unit 110 and requested driving force calculation unit 120, and an inverter command output unit 140 connected to creep torque calculation unit 130.

Creep torque reflection ratio setting unit 110 sets a creep torque reflection ratio based on the amount by which the brake pedal is operated BP received from brake pedal position sensor 56, vehicular speed V received from vehicular speed sensor 58, and the brake fluid's pressure received from brake fluid pressure sensor 72.

Requested driving force calculation unit 120 calculates requested driving force based on accelerator pedal position ACC received from accelerator pedal position sensor 54 and vehicular speed V received from vehicular speed sensor 58.

Creep torque calculation unit 130 calculates a creep torque based on the creep torque reflection ratio set at creep torque reflection ratio setting unit 110 and the requested driving force calculated at requested driving force calculation unit 120.

Inverter command output unit 140 outputs a command signal to inverter 34 to cause motor 30 to output the creep torque calculated at creep torque calculation unit 130.

The control device having such function block according to the present embodiment can be implemented by hardware mainly of a configuration of a digital circuit, an analog circuit and the like, or software mainly of CPU 102 and ROM 104 included in ECU 100 and a program read from ROM 104 and executed by CPU 102. In general, it is said that the control device implemented by hardware is advantageous in speed of operation and that the control device implemented by software is advantageous in changing a design. Hereinafter will be described a control device implemented by software. Note that a storage medium having such a program stored therein is also a manner of the present invention.

Figure 3:
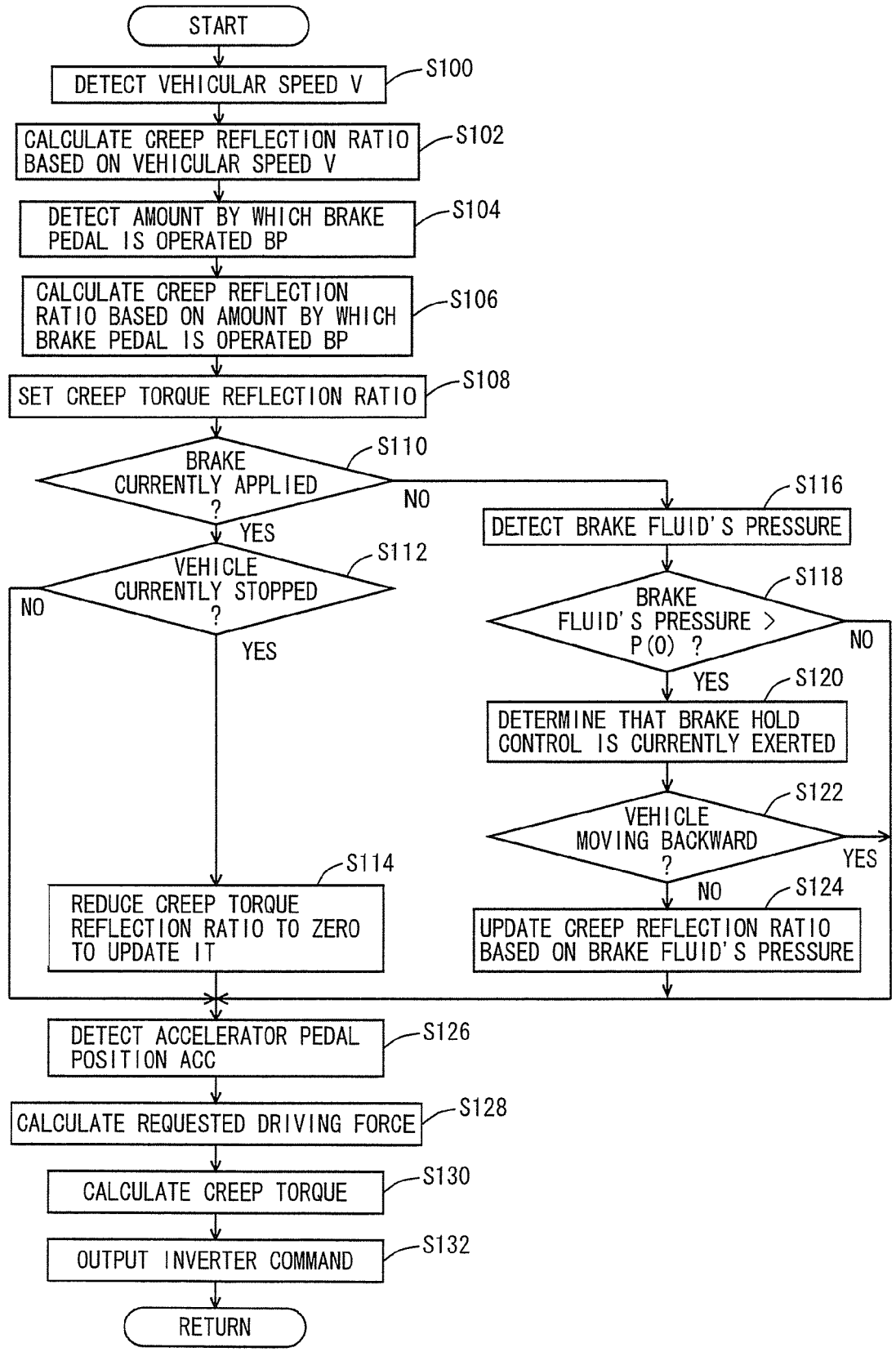
FIG. 3 is a flow chart representing a structure of an ECU serving as the control device for control according to the first embodiment of the present invention.

With reference to FIG. 3, when the control device according to the present embodiment, or ECU 100, causes motor 30 to output a creep torque, it executes a program having a structure for control, as will be described hereinafter. Note that this program is repeatedly executed at a predetermined cycle time.

At step (S) 100, ECU 100 detects vehicular speed V based on a signal received from vehicular speed sensor 58.

Figure 4:
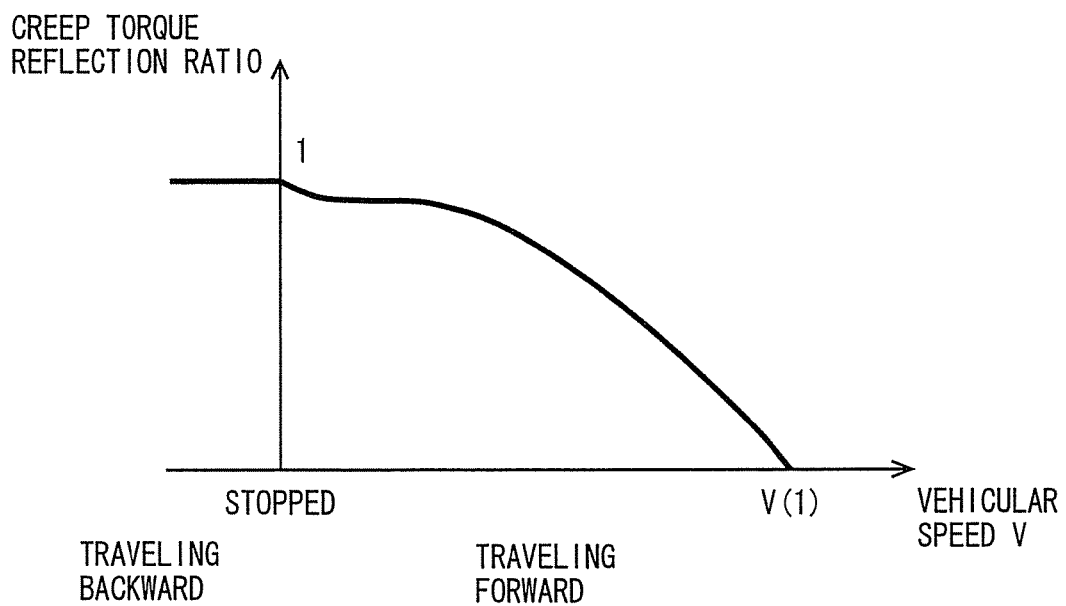
FIG. 4 shows a relationship between vehicular speed and a creep torque reflection ratio.

At S102, ECU 100 calculates a creep torque reflection ratio based on vehicular speed V. ECU 100 calculates the creep torque reflection ratio for example as based on a map having vehicular speed V as a parameter. In this map, a creep torque reflection ratio is set as shown in FIG. 4: When vehicular speed V with the vehicle traveling forward is higher than V(1) the creep torque reflection ratio is set at 0. As vehicular speed V with the vehicle traveling forward decreases from V(1) to be lower, the creep torque reflection ratio gradually increases. When vehicular speed V=0 (i.e., when the vehicle is stopped) or when the vehicle travels backward, the creep torque reflection ratio is set at 1. Note that the method of calculating a creep torque reflection ratio based on vehicular speed V is not limited to the above method.

At S104, ECU 100 detects the amount by which the brake pedal is operated BP based on a signal received from brake pedal position sensor 56.

Figure 5:
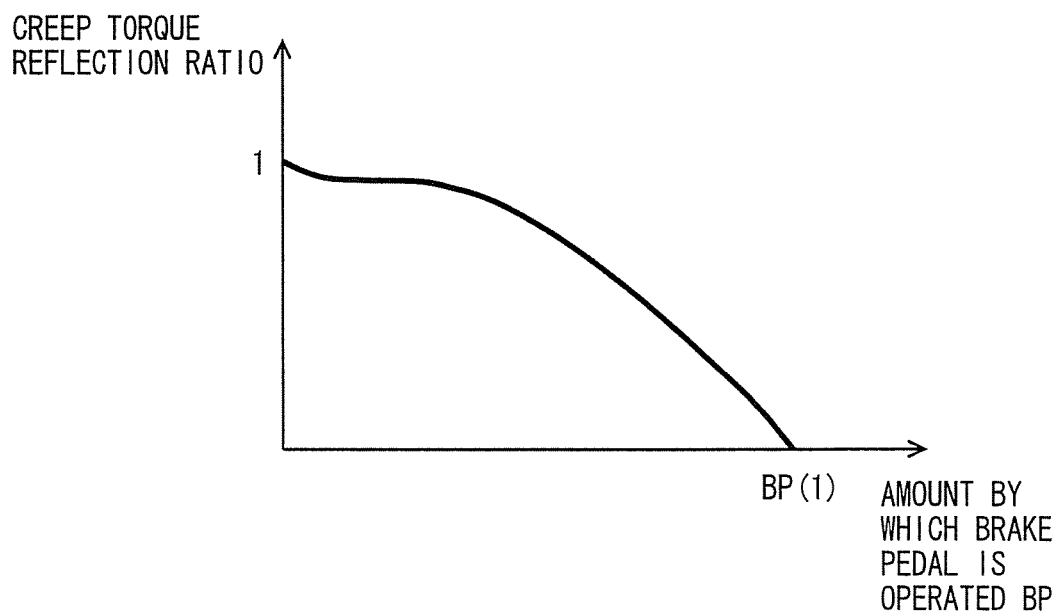
FIG. 5 shows a relationship between an amount by which a brake pedal is operated and a creep torque reflection ratio.

At S106, ECU 100 calculates a creep torque reflection ratio based on the amount by which the brake pedal is operated BP. ECU 100 calculates the creep torque reflection ratio for example as based on a map having the amount by which the brake pedal is operated BP as a parameter. In this map, a creep torque reflection ratio is set as shown in FIG. 5: When the amount by which the brake pedal is operated BP is larger than BP(1) the creep torque reflection ratio is set at 0. When the amount by which the brake pedal is operated BP decreases from BP(1) to be smaller, the creep torque reflection ratio gradually increases. When the amount by which the brake pedal is operated BP=0 (i.e., when the brake pedal is released) the creep torque reflection ratio is set at 1. Note that the method of calculating a creep torque reflection ratio based on the amount by which the brake pedal is operated BP is not limited to the above method.

At S108, ECU 100 sets a creep torque reflection ratio. For example ECU 100 sets as the creep torque reflection ratio a smaller one of the creep torque reflection ratio calculated based on vehicular speed V and that calculated based on the amount by which the brake pedal is operated BP. Note that the method of setting the creep torque reflection ratio is not limited to the above.

At S110, ECU 100 determines whether brake is applied. For example, ECU 100 determines that brake is applied when the amount by which the brake pedal is operated BP is larger than a predetermined threshold value. If brake is applied (YES at S110), the process proceeds to S112. Otherwise (NO at S110), the process proceeds to S116.

At S112, ECU 100 determines from vehicular speed V whether the vehicle is currently stopped. If so (YES at S112), the process proceeds to S114. Otherwise (NO at S112), the process proceeds to S126.

At S114, ECU 100 decreases to 0 the creep torque reflection ratio set at S108, and thus updates the creep torque reflection ratio.

At S116, ECU 100 detects the brake fluid's pressure based on a signal received from brake fluid pressure sensor 72.

At S118, ECU 100 determines whether the brake fluid's pressure is larger than a predetermined hydraulic pressure value P(0). The predetermined hydraulic pressure value P(0) is set to be a value larger by a predetermined value than the brake fluid's pressure that is provided when the driver does not operate brake pedal 55. If the brake fluid's pressure is larger than hydraulic pressure value P(0) (YES at S118), the process proceeds to S120. Otherwise (NO at S118), the process proceeds to S126.

At S120, ECU 100 determines that the brake hold control is currently exerted. At S122, ECU 100 determines from vehicular speed V whether the vehicle is currently moving backward. If so (YES at S122), the process proceeds to S126. Otherwise (NO at S122), the process proceeds to S124.

Figure 6:
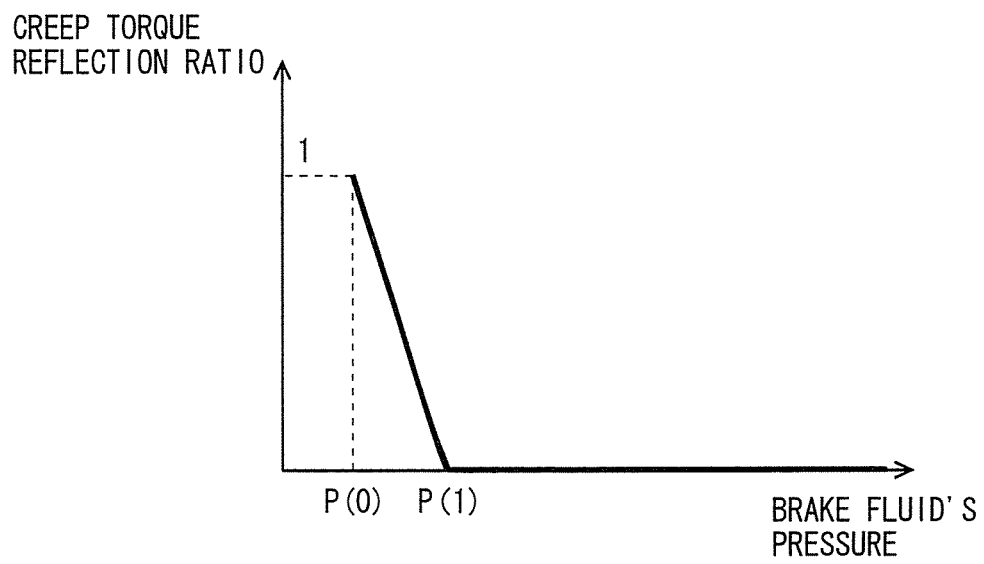
FIG. 6 shows a relationship between brake fluid's pressure and a creep torque reflection ratio.

At S124 ECU 100 updates as based on the brake fluid's pressure the creep torque reflection ratio set at S108. For example ECU 100 updates the creep torque reflection ratio, as based on a map having the brake fluid's pressure as a parameter. In this map, the creep torque reflection ratio is set as shown in FIG. 6: When the brake fluid's pressure is larger than P(1) the creep torque reflection ratio is updated to be 0. When the brake pedal's hydraulic pressure decreases from P(1) the creep torque reflection ratio gradually increases. When the brake fluid's pressure has hydraulic pressure value P(0) the creep torque reflection ratio is updated to be 1. Note that the method of updating a creep torque reflection ratio based on the brake fluid's pressure is not limited to the above.

At S126, ECU 100 detects accelerator pedal position ACC based on a signal received from accelerator pedal position sensor 54.

Figure 7:
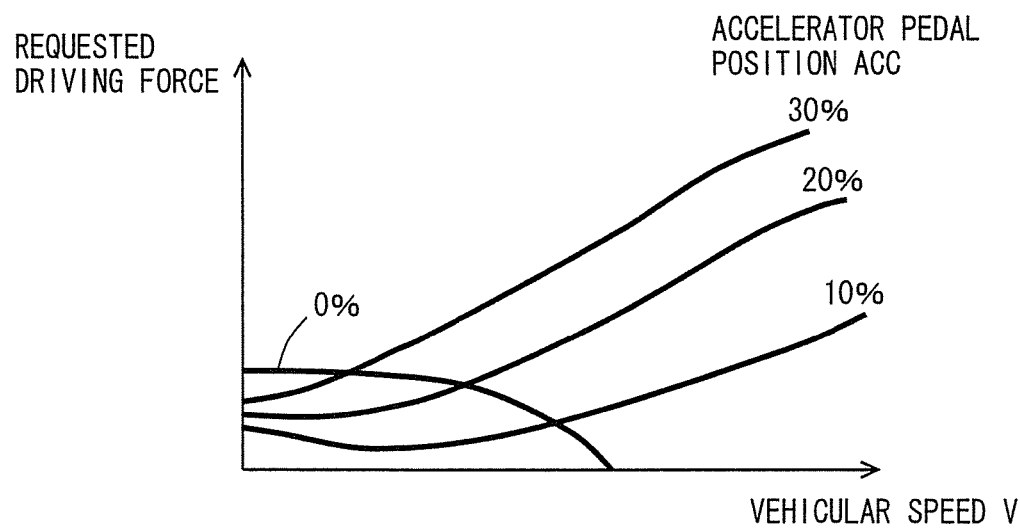
FIG. 7 shows a relationship between vehicular speed, an accelerator pedal position, and requested driving force.

At S128, ECU 100 calculates requested driving force. For example ECU 100 calculates requested driving force, as based on a map having vehicular speed V and accelerator pedal position ACC as parameters, as shown in FIG. 7.

At S130, ECU 100 calculates a creep torque. ECU 100 multiplies the calculated requested driving force by the creep torque reflection ratio and provides the resultant value as the creep torque.

At S132, ECU 100 outputs a command signal to inverter 34 to cause motor 30 to output the calculated creep torque.

In accordance with the above structure and flowchart the control device according to the present embodiment, or ECU 100, controls electric vehicle 20 to operate, as will be described hereinafter.

For the sake of illustration, brake hold switch 74 is turned on and in that condition the driver operates brake pedal 55 in the D position and electric vehicle 20 is stopped.

A smaller one of a creep torque reflection ratio calculated based on vehicular speed V (S102) and a creep torque reflection ratio calculated based on the amount by which the brake pedal is operated BP (S106) is set as a creep torque reflection ratio (S108). However, brake is applied (YES at S110) and the vehicle is currently stopped (YES at S112). Accordingly, the creep torque reflection ratio becomes 0 (S114), a creep torque is suppressed to be 0 (S130), and motor 30 is stopped (S132).

Figure 8:
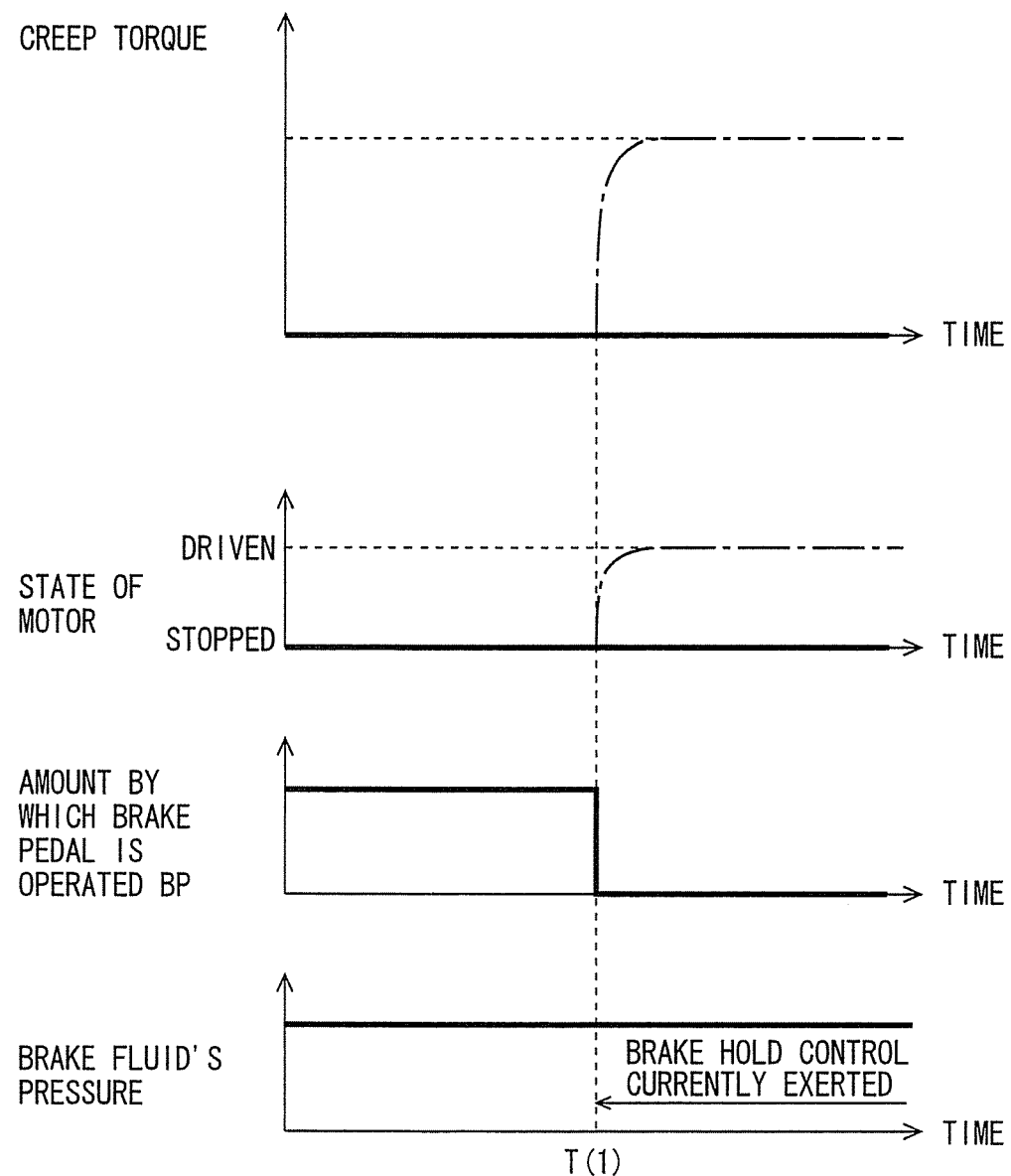
FIG. 8 is timing plots representing a state of a motor and a creep torque in a vehicle having the control device mounted therein according to the first embodiment of the present invention.

As shown in FIG. 8, at time T(1), once the amount by which the brake pedal is operated BP has become approximately zero and the brake has thus been released (NO at S110), then until accelerator pedal 53 is operated to provide accelerator pedal position ACC larger than a threshold value, the brake hold control is exerted to maintain the brake fluid's pressure. In other words, even if brake pedal 55 is operated, a braking force is maintained.

In such a condition, using the electric power of battery 36 to drive motor 30 to generate a creep torque will be wasteful energy consumption.

Accordingly, if the brake fluid's pressure is larger than the predetermined hydraulic pressure value P(0) (YES at S118), a decision is made that the brake hold control is currently exerted (S120). If the vehicle is not moving backward (NO at 5122) and the brake fluid's pressure is larger than P(1) (see FIG. 6), the creep torque reflection ratio is held at 0 (S124), and, as shown in FIG. 8, motor 30 is held stopped (S132). This can prevent the wasteful electric power consumption otherwise incurred as motor 30 is driven to generate a creep torque at time T(1), i.e., when the amount by which the brake pedal is operated BP becomes approximately zero, as indicated in FIG. 8 by an alternate long and short dashed line.

Note that if a decision is made that the brake hold control is currently exerted (S120), and the brake fluid's pressure is small, there is a problem, as follows: When a vehicle is stopped on an uphill road and in that condition a creep torque is suppressed, the vehicle may be moved backward by its self weight against the driver's intention. To prevent the vehicle from moving backward, if the brake pedal's hydraulic pressure is smaller than P(1) the creep torque reflection ratio is updated such that the smaller than and thus farther away from P(1) the brake pedal's hydraulic pressure becomes, the larger the creep torque reflection ratio gradually becomes (see FIG. 6) (S124). Thus when the brake fluid's pressure has a smaller value and there is an increased possibility that on an uphill road the vehicle may be moved backward by its self weight, a creep torque less suppressed can be provided to ensure that the vehicle does not move backward.

Furthermore, if a decision is made that the brake hold control is currently exerted (S120), and the vehicle is moving backward (YES at S122), then, updating a creep torque reflection ratio, as based on the brake fluid's pressure, is not performed. Thus when the vehicle is actually moved backward for example on an uphill road by its self weight, a creep torque is generated, rather than suppressed, to prevent the vehicle from moving backward.

Thus the present embodiment can provide a control device such that when a driver does not operate a brake pedal and brake fluid's pressure is larger than a predetermined hydraulic pressure value, a decision is made that brake hold control is currently exerted, and a motor is stopped to suppress a creep torque. Thus when the brake pedal is not operated and a braking force is acting on the vehicle a creep torque can be suppressed to achieve reduced wasteful power consumption.

Second Embodiment

Figure 9:
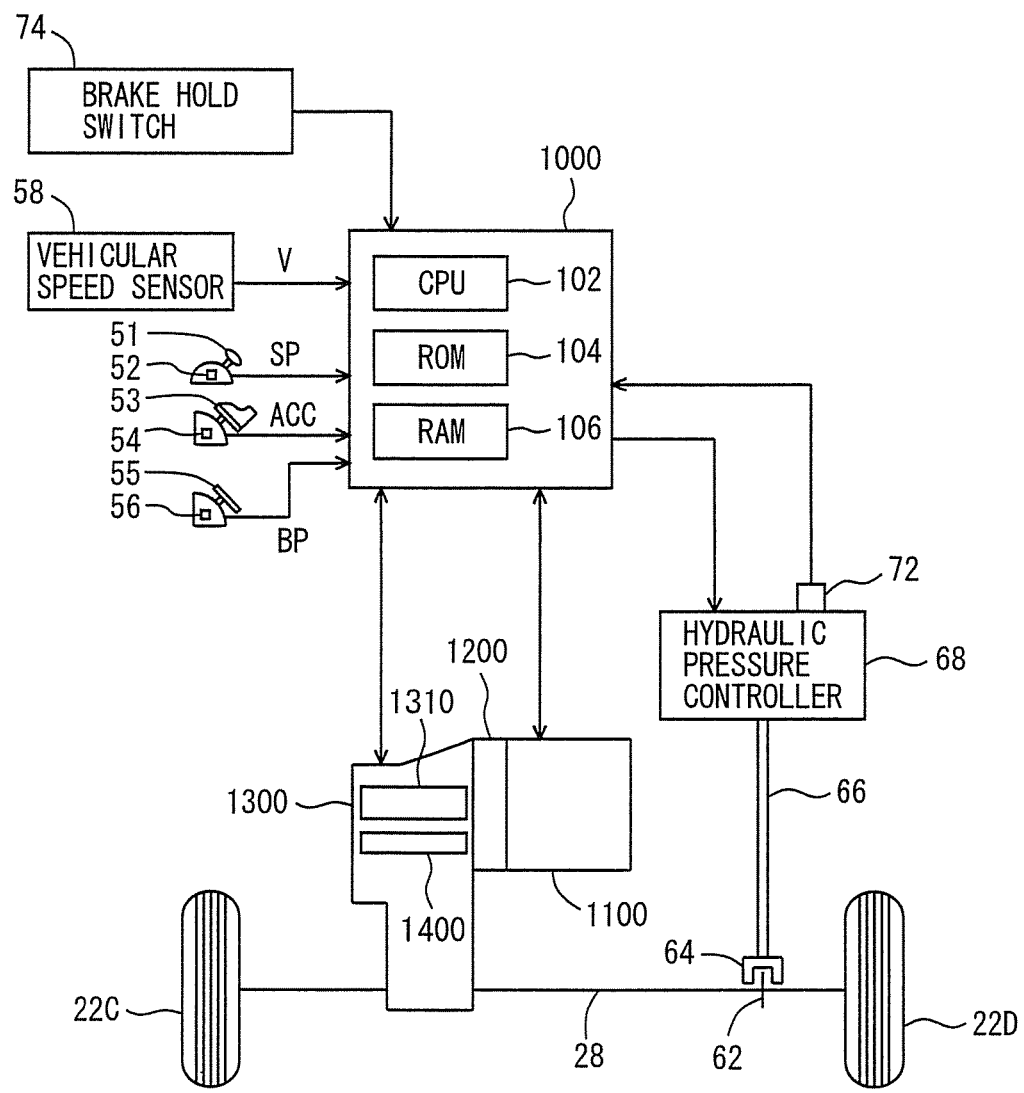
FIG. 9 shows a structure of a vehicle having a control device mounted therein according to a second embodiment of the present invention.

With reference to FIG. 9, the present embodiment provides a control device as will be described hereinafter. More specifically, the present embodiment provides a control device mounted in a vehicle different in configuration from electric vehicle 20 having the control device of the first embodiment mounted therein, in that differential gear 24, propeller shaft 26, motor 30, rotational position detection sensor 32, inverter 34, battery 36, and ECU 100 are replaced with an engine 1100, a torque converter 1200, an automatic transmission 1300, a hydraulic circuit 1400, and an ECU 1000. ECU 1000 is different from ECU 100 only in a structure of a program executed for control. The remainder in configuration is identical to that in configuration of electric vehicle 20 of the first embodiment described above. Identical configurations are identically denoted, and their functions are also identical. Accordingly herein they will not be described repeatedly in detail. While hereinafter the vehicle will be described as a front engine front drive (FF) vehicle, the control device of the present embodiment is also applicable to vehicles other than the FF vehicle.

The vehicle includes engine 1100, automatic transmission 1300 connected to engine 1100 via torque converter 1200, hydraulic circuit 1400, and ECU 1000.

Engine 1100 is an internal combustion engine combusting in a combustion chamber of a cylinder a gaseous mixture of a fuel injected through an injector (not shown) and air. The combustion pushes a piston in the cylinder downward to rotate a crankshaft. The internal combustion engine may be replaced with an external combustion engine.

Automatic transmission 1300 includes a planetary gear unit 1310. Planetary gear unit 1310 is provided with a clutch, a brake and a similar, plurality of frictional engagement elements. Each element's engagement force is controlled by hydraulic circuit 1400 in response to a control signal issued from ECU 1000. Each frictional engagement element's varying engagement force controls automatic transmission 1300 to selectively have one of a state of transmitting power of engine 1100 to drive wheels 22C and 22D and a neutral state preventing transmission of power from engine 1100. Automatic transmission 1300 has an output gear connected to drive shaft 28.

When a shift position assumes the D position, automatic transmission 1300 is controlled to have the state of transmitting power. Accordingly, when engine 1100 rotates at idle, engine 1100 outputs a torque which is in turn transmitted via torque converter 1200 to automatic transmission 1300 and further to drive wheels 22C, 22D to generate a creep torque.

In the present embodiment when brake pedal 55 is operated and the vehicle is currently stopped it is considered that the vehicle is stopped by the driver's intention. Furthermore, if brake pedal 55 is not operated, and the brake hold control is exerted, the braking force applied when the vehicle is stopped is maintained. If in such cases automatic transmission 1300 is held in the state of transmitting power and a creep torque is generated, and the generated creep torque is suppressed by brake, the power from engine 1100 is consumed at torque converter 1200 as thermal energy and the operation of engine 1100 is also suppressed by torque converter 1200. This would reduce the fuel economy of engine 1100.

Accordingly in the present embodiment the control device exerts control, as based on the amount by which the brake pedal is operated BP and the brake fluid's pressure, to allow automatic transmission 1300 to have a neutral state to suppress a creep torque (i.e., neutral control).

Figure 10:
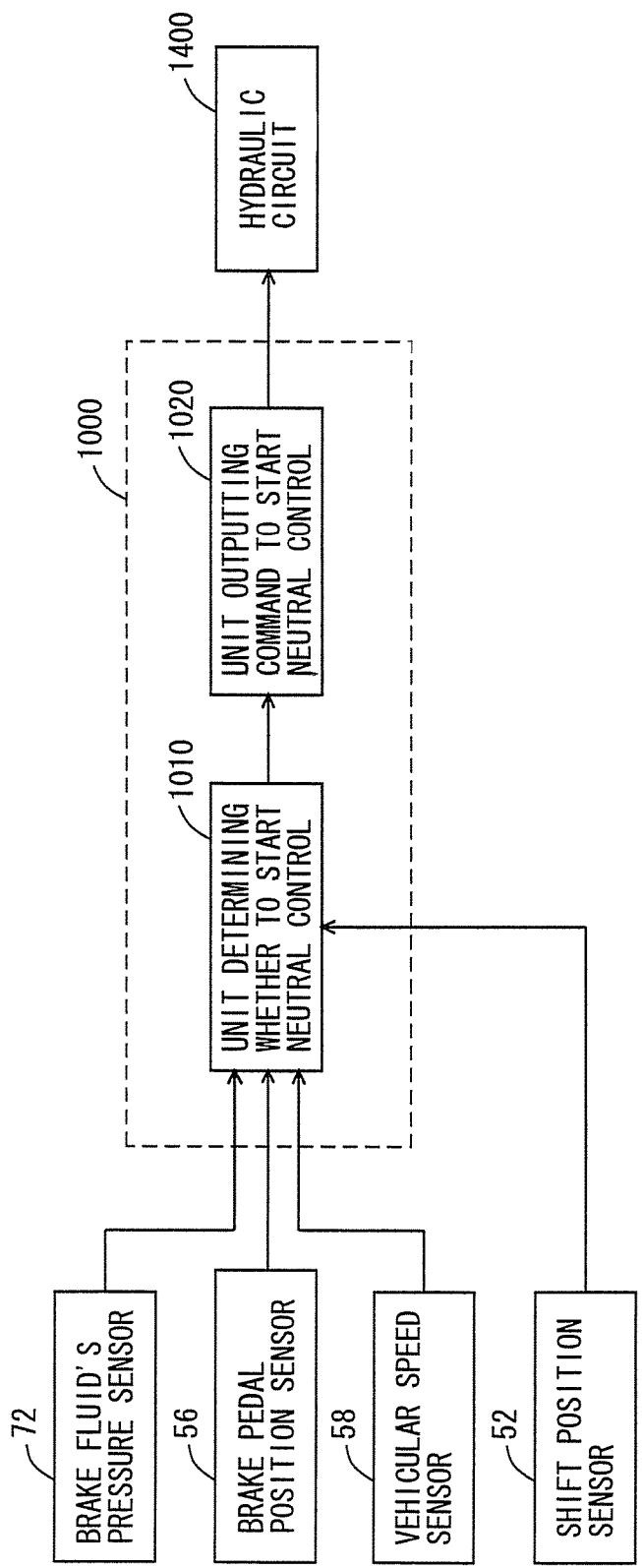
FIG. 10 is a block diagram of a function of the control device according to the second embodiment of the present invention.

Reference will be made to FIG. 10 to describe a functional block diagram of the control device of the present embodiment. As shown in FIG. 10, the control device includes a unit 1010 determining whether the neutral control should be started and a unit 1020 outputting a command to start the neutral control.

Unit 1010 determining whether the neutral control should be started determines whether the neutral control should be started, as based on shift position SP issued from shift position sensor 52, the amount by which the brake pedal is operated BP issued from brake pedal position sensor 56, vehicular speed V issued from vehicular speed sensor 58, and the brake fluid's pressure issued from brake fluid pressure sensor 72.

Unit 1020 outputting a command to start the neutral control receives a decision made by unit 1010 determining whether the neutral control should be started, and in accordance with the decision, unit 1020 outputs a command to hydraulic circuit 1400 to start the neutral control.

Figure 11:
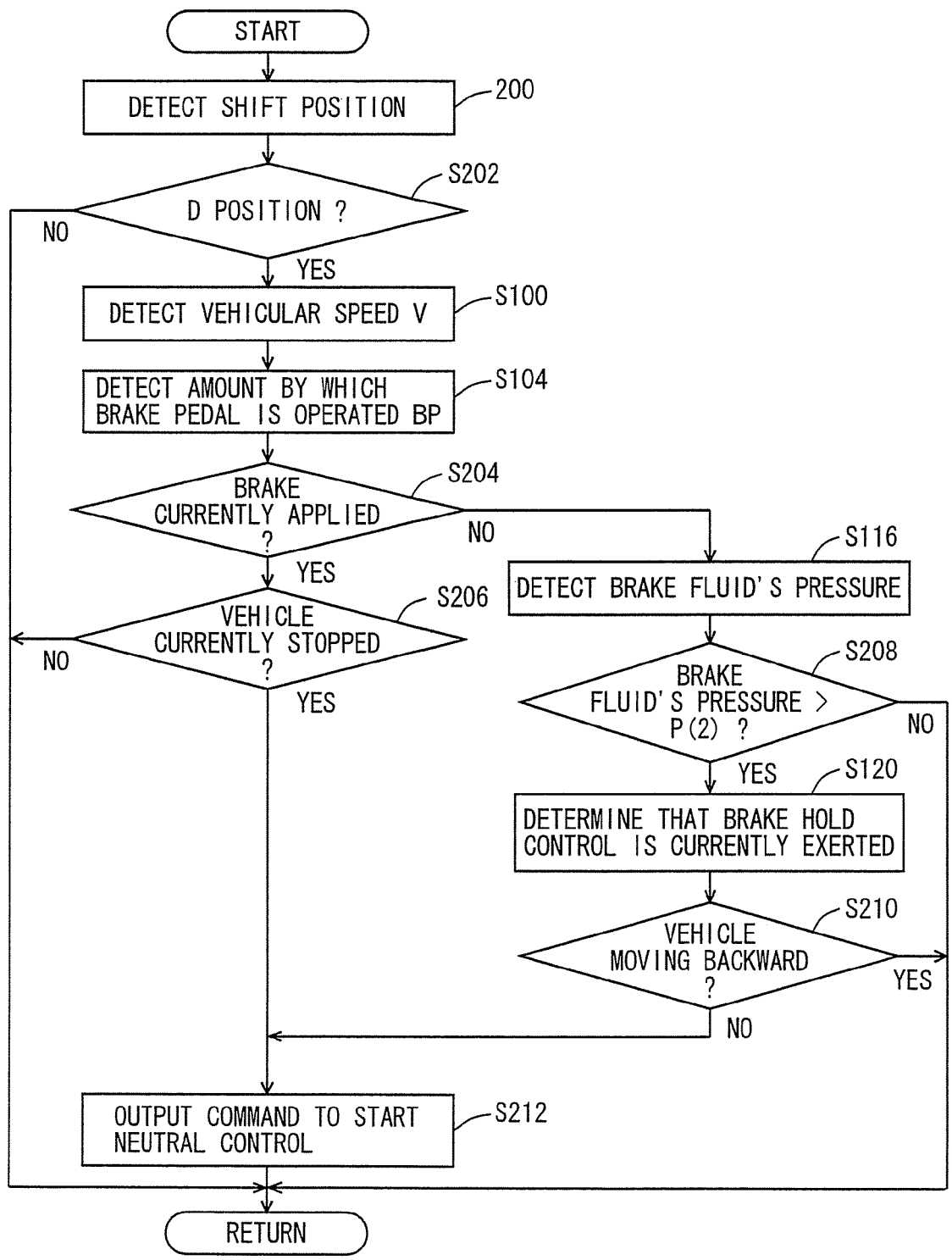
FIG. 11 is a flow chart representing a structure of an ECU serving as the control device for control according to the second embodiment of the present invention.

With reference to FIG. 11, when the control device of the present embodiment, or ECU 1000, exerts the neutral control, it executes a program having a structure for control, as will be described hereinafter. In the FIG. 11 flowchart the steps identical to those in the FIG. 3 flowchart are identically denoted and will not be described repeatedly in detail.

At S200, ECU 1000 detects shift position SP based on a signal received from shift position sensor 52.

At S202, ECU 1000 determines whether shift position SP is the D position. If it is the D position (YES at S202), the process proceeds to S100. Otherwise (NO at S202), the process ends.

At S204, ECU 1000 determines whether brake is currently applied. If brake is currently applied (YES at S204), the process proceeds to S206. Otherwise (NO at S204), the process proceeds to S116.

At S206, ECU 1000 determines from vehicular speed V whether the vehicle is currently stopped. If so (YES at S206), the process proceeds to S212. Otherwise (NO at S206), the process ends.

At S208, ECU 1000 determines whether the brake fluid's pressure is larger than a predetermined hydraulic pressure value P(2). Predetermined hydraulic pressure value P(2) is set to be a value larger by a predetermined value than the brake fluid's pressure that is provided when the driver does not operate brake pedal 55. If the brake fluid's pressure is larger than hydraulic pressure value P(2) (YES at S208), the process proceeds to S120. Otherwise (NO at S208), the process ends.

At S210, ECU 1000 determines from vehicular speed V whether the vehicle is currently moving backward. If so (YES at S210), the process ends. Otherwise (NO at S210), the process proceeds to 5212.

At S212, ECU 1000 outputs a command to hydraulic circuit 1400 to start the neutral control.

In accordance with the above structure and flowchart the control device according to the present embodiment, or ECU 1000, controls a vehicle to operate, as will be described hereinafter.

When brake hold switch 74 is turned on and in that condition the driver operates brake pedal 55 in the D position (YES at 5202) to apply brake (YES at 5204) to stop the vehicle (YES at S206), the neutral control is exerted (S212) to control automatic transmission 1300 to have the neutral state.

As shown in FIG. 12, at time T(2), once the amount by which the brake pedal is operated BP has become approximately zero and the brake has been released (NO at S204), then until accelerator pedal 53 is operated and accelerator pedal position ACC becomes larger than a threshold value, the brake hold control is exerted and the brake fluid's pressure is maintained. In other words, even if brake pedal 55 is operated, a braking force is maintained.

If in such a condition automatic transmission 1300 is held in the state of transmitting power and a creep torque is generated, and the generated creep torque is suppressed by brake, the power from engine 1100 is consumed at torque converter 1200 as thermal energy and the operation of engine 1100 is also suppressed by torque converter 1200. This would reduce the fuel economy of engine 1100.

Accordingly, if the brake fluid's pressure is larger than the predetermined hydraulic pressure value P(2) (YES at S208), a decision is made that the brake hold control is currently exerted (S120). The vehicle does not move backward (NO at S120), the neutral control is continuously exerted (S212), and as shown in FIG. 8, automatic transmission 1300 is held in the neutral state. This can prevent the wasteful fuel consumption otherwise incurred as automatic transmission 1300 is controlled to have the state of transmitting power to generate a creep torque at time T(2), i.e., when the amount by which the brake pedal is operated BP is approximately zero, as indicated in FIG. 12 by an alternate long and short dashed line.

Thus the present embodiment provides a control device such that when an amount by which a brake pedal is operated is approximately zero, and brake fluid's pressure is larger than a predetermined hydraulic pressure value, a decision is made that brake hold control is currently exerted, and an automatic transmission is set in a neutral state to suppress a creep torque. Thus, when the amount by which the brake pedal is operated is approximately zero, and a braking force is acting on the vehicle, a creep torque can be suppressed to achieve reduced wasteful power consumption.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A control device for a vehicle having a motive power source and a braking device and generating a creep torque by said motive power source, wherein once said vehicle stopped in a forward traveling position has a brake pedal operated to a degree larger than a predetermined degree, brake hold control is exerted to control said braking device such that until a request by a driver to start said vehicle is detected, a braking force that is applied when said vehicle is stopped is held even if said brake pedal is not operated, the control device comprising:

a detection unit detecting that said driver is operating said brake pedal;
a vehicular speed detection unit detecting vehicular speed;
an operation state detection unit detecting whether said braking force is held if said brake pedal is not operated; and
a processing unit, wherein:
said processing unit determines from said vehicular speed whether said vehicle is currently stopped;
if said brake pedal is not operated, said processing unit determines whether to suppress said creep torque, based on whether said braking force is held; and
if a decision is made to suppress said creep torque, said processing unit suppresses said creep torque.

2. The control device according to claim 1, wherein:
said braking device is a hydraulic braking device;
said operation state detection unit detects hydraulic pressure in said braking device; and
if said brake pedal is not operated, and said hydraulic pressure detected is larger than a predetermined threshold value, said processing unit determines to suppress said creep torque.

3. The control device according to claim 2, wherein:
said motive power source is a rotating electric machine; and
said processing unit suppresses said creep torque by controlling said rotating electric machine to cause said rotating electric machine to provide a reduced output.

4. The control device according to claim 3, wherein if with said brake pedal not operated, said decision is made to suppress said creep torque, said processing unit suppresses said creep torque by controlling said rotating electric machine to cause said rotating electric machine to provide an output such that when said hydraulic pressure detected is large pressure said output is smaller than when said hydraulic pressure detected is small pressure.

5. The control device according to claim 2, wherein:
said vehicle has an automatic transmission connected to said motive power source and having an engagement element engaged when said vehicle starts; and
said processing unit suppresses said creep torque by controlling said automatic transmission to release said engagement element.

6. A control device for a vehicle having a motive power source and a braking device and generating a creep torque by said motive power source, wherein once said vehicle stopped in a forward traveling position has a brake pedal operated to a degree larger than a predetermined degree, brake hold control is exerted to control said braking device such that until a request by a driver to start said vehicle is detected, a braking force that is applied when said vehicle is stopped is held even if said brake pedal is not operated, the control device comprising:
a detection unit detecting that said driver is operating said brake pedal;
a vehicular speed detection unit detecting vehicular speed;
an operation state detection unit detecting whether said braking force is held if said brake pedal is not operated;
a judgment unit judging from said vehicular speed whether said vehicle is currently stopped;
a first determination unit determining whether to suppress said creep torque, based on whether said braking force is held, if said brake pedal is not operated; and
a suppression unit suppressing said creep torque if a decision is made to suppress said creep torque.

7. The control device according to claim 6, wherein:
said braking device is a hydraulic braking device;
said operation state detection unit detects a hydraulic pressure in said braking device; and
said second determination unit determines to suppress said creep torque if said hydraulic pressure detected is larger than a predetermined threshold value.

8. The control device according to claim 7, wherein:
said motive power source is a rotating electric machine; and
said suppression unit suppresses said creep torque by controlling said rotating electric machine to cause said rotating electric machine to provide a reduced output.

9. The control device according to claim 8, wherein said suppression unit suppresses said creep torque if said second determination unit determines to suppress said creep torque, by controlling said rotating electric machine to cause said rotating electric machine to provide an output such that when said hydraulic pressure detected is large pressure said output is smaller than when said hydraulic pressure detected is small pressure.

10. The control device according to claim 7, wherein:
said vehicle has an automatic transmission connected to said motive power source and having an engagement element engaged when said vehicle starts; and
said suppression unit suppresses said creep torque by controlling said automatic transmission to release said engagement element.

11. A method of controlling a vehicle having a motive power source and a braking device and generating a creep torque by said motive power source, wherein once said vehicle stopped in a forward traveling position has a brake pedal operated to a degree larger than a predetermined degree, brake hold control is exerted to control said braking device such that until a request by a driver to start said vehicle is detected a braking force that is applied when said vehicle is stopped is held even if said brake pedal is not operated, the method comprising:
a step of detecting that said driver is operating said brake pedal;
a step of detecting vehicular speed;
a detection step of detecting whether said braking force is held if said brake pedal is not operated;
a step of judging from said vehicular speed whether said vehicle is currently stopped;
a first determination step of determining whether to suppress said creep torque, based on whether said braking force is held, if said brake pedal is not operated; and
a suppression step of suppressing said creep torque if a decision is made to suppress said creep torque.

12. The method of controlling a vehicle according to claim 11, wherein:
said braking device is a hydraulic braking device;
the detection step includes the step of detecting hydraulic pressure in said braking device; and
the second determination step includes the step of determining to suppress said creep torque if said hydraulic pressure detected is larger than a predetermined threshold value.

13. The method of controlling a vehicle according to claim 12, wherein:
said motive power source is a rotating electric machine; and
the suppression step includes the step of suppressing said creep torque by controlling said rotating electric machine to cause said rotating electric machine to provide a reduced output.

14. The method of controlling a vehicle according to claim 13, wherein the suppression step includes the step of suppressing said creep torque if in the second determination step said decision is made to suppress said creep torque, by controlling said rotating electric machine to cause said rotating electric machine to provide an output such that when said hydraulic pressure detected is large pressure said output is smaller than when said hydraulic pressure detected is small pressure.

15. The method of controlling a vehicle according to claim 12, wherein:
said vehicle has an automatic transmission connected to said motive power source and having an engagement element engaged when said vehicle starts; and
the suppression step includes the step of suppressing said creep torque by controlling said automatic transmission to release said engagement element.

16. A storage medium having a program stored therein readably by a computer for causing said computer to execute the method of controlling a vehicle according to claim 11.

17. The control device according to claim 1, wherein:
if said brake pedal is operated, said processing unit determines whether to suppress said creep torque, based on whether said vehicle is currently stopped.

18. The control device according to claim 6, further comprising a second determination unit determining whether to suppress said creep torque, based on whether said vehicle is currently stopped, if said brake pedal is operated.

19. The method according to claim 11, further comprising a second determination step of determining whether to suppress said creep torque, based on whether said vehicle is currently stopped, if said brake pedal is operated.

* * * * *

UNITED STATES PATENT AND TRADEMARK OFFICE
CERTIFICATE OF CORRECTION

PATENT NO. : 8,606,441 B2
APPLICATION NO. : 12/517225
DATED : December 10, 2013
INVENTOR(S) : K. Ueoka It is certified that error appears in the above-identified patent and that said Letters Patent is hereby corrected as shown below:

In the Specification

Column 5, line 28, change "signal 0" to -- signal $\theta$ --.

Column 9, line 13, change "5122)" to -- S122) --.

Column 11, line 35, change "5212" to -- S212 --.

Column 11, line 44, change "at 5202" to -- at S202 --.

Column 11, line 44, change "at 5204" to -- at S204 --.

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,606,441 B2
APPLICATION NO.  : 12/517225
DATED            : December 10, 2013
INVENTOR(S)      : Kiyoshiro Ueoka Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this
Twenty-second Day of September, 2015

Michelle K. Lee
*Director of the United States Patent and Trademark Office*